United States Patent [19]

Shlager

[11] 4,228,594
[45] Oct. 21, 1980

[54] LAYOUT TOOL FOR LOCATING HOLES ON STRUCTURAL STEEL

[76] Inventor: Abraham E. Shlager, 4911 Bimini Dr., Brandenton, Fla. 33507

[21] Appl. No.: 46,201

[22] Filed: Jun. 6, 1979

[51] Int. Cl.³ .................. B23B 49/02; G01B 5/14
[52] U.S. Cl. ............................. 33/189; 33/429; 33/138; 33/481
[58] Field of Search ............ 33/403, 415–417, 33/429, 481, 427, 180 R, 189 R, 191, 174 R, 174 G, 1 G, 138

[56] References Cited

U.S. PATENT DOCUMENTS

| | | | |
|---|---|---|---|
| 1,046,187 | 12/1912 | Herlund | 33/189 X |
| 1,382,271 | 6/1921 | Cunningham | 33/189 |
| 1,725,476 | 8/1929 | Poppock | 33/427 X |
| 1,826,807 | 10/1931 | McDanel | 33/189 |
| 3,731,390 | 5/1973 | Sloan | 33/189 |

FOREIGN PATENT DOCUMENTS

| | | | |
|---|---|---|---|
| 460914 | 6/1928 | Fed. Rep. of Germany | 33/189 |
| 1169684 | 5/1964 | Fed. Rep. of Germany | 33/189 |

*Primary Examiner*—Harry N. Haroian
*Attorney, Agent, or Firm*—Wolf, Greenfield & Sacks

[57] ABSTRACT

A layout tool is movable along a structural beam or girder and includes measuring scales adapted to facilitate accurate location of holes to be formed at selected places on the beam. The tool is adapted for manual use at the construction site.

5 Claims, 4 Drawing Figures

LAYOUT TOOL FOR LOCATING HOLES ON STRUCTURAL STEEL

BACKGROUND OF THE INVENTION

Steel girders or structural beams typically require that holes be formed in their flanges and/or webs at selected locations to receive connecting bolts, rivets or other fasteners. Typically, the holes are preformed at the mill where the steel beam is rolled. This usually requires special, very expensive, complex and heavy machinery which moves the steel beam relative to a hole forming device such as, for example, the system shown in U.S. Pat. No. 3,391,593. The present invention is an alternative approach to this technique. Rather than laying out and drilling the holes at the mill, in accordance with the present invention these functions are performed at the building site, and without turning the beam. This permits complete fabrication at the site with minimum overhead costs and with minimum detailing. One man can with the aid of the layout tool fabricate the beam.

SUMMARY OF THE INVENTION

One embodiment of tool includes a frame supported by an adjustable post which in turn carries a horizontal plate designed to rest on the web of an I-beam. The frame in turn carries a pair of depending arms each of which carries a vertical plate designed to rest against the sides of a flange of the beam. Each plate has a scale along at least one edge. The scale of the plate on the web measures the distance from one flange of the beam, and the adjustable post enables the scales on the plates carried by the arms to be keyed to the center line of the web. Thus holes on the beam web and flanges may readily be located. The tool may be moved along the beam, and its location lengthwise of the beam may be determined by a steel measuring tape oriented lengthwise along the beam.

The principal object of the present invention is to provide a portable layout tool that may be used at the building site to locate the holes on beams for fabrication without the need for turning the beam. A further object of the invention is to provide a layout tool of the type described, which is of simple and relatively inexpensive construction, which is accurate and easy to use, and which will provide very substantial cost savings for the user.

To accomplish these and other objects, the layout tool of this invention includes a frame having a central vertical post and a horizontal bridge connected intermediate its ends to the top of the post. A horizontal plate is connected to the bottom of the post, and the plate is arranged to rest on the upper surface of the web in a horizontal plane. A pair of legs connected to the ends of the bridge extend downwardly on the outside of the flanges of the beam and vertical plates connected to the legs are disposed to lie against the outer surfaces of the beam flanges. Scales provided on each of the plates are scaled to measure distances on the web from one of the flanges and on the flanges from the plane of the web.

DETAILED DESCRIPTION

Figure 1:
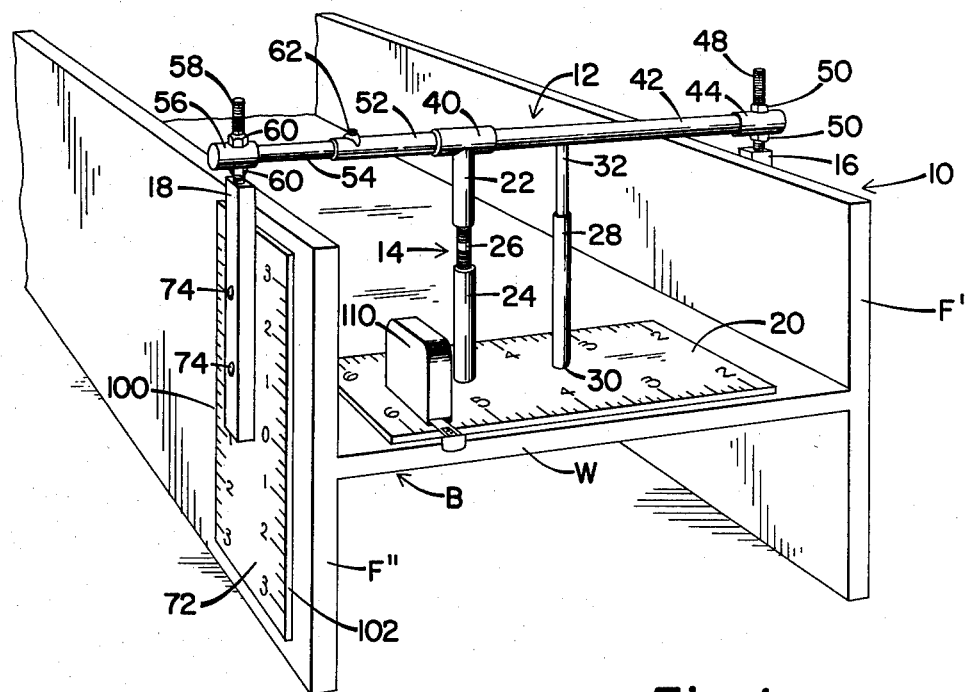
FIG. 1 is a perspective view of the layout tool of this invention shown positioned on a beam to perform its intended function.
Figure 2:
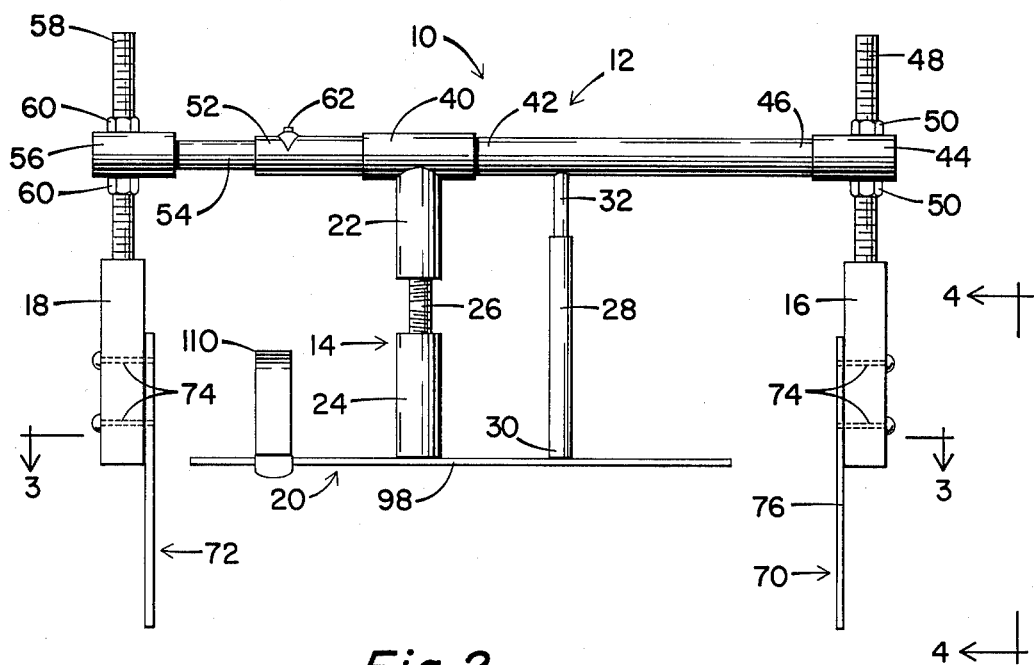
FIG. 2 is a front elevation view of the layout tool.

In FIG. 1 the layout tool 10 is shown mounted on a beam B having a web W and flanges F' and F". The layout tool 10 includes a bridge 12, post 14 and vertical arms 16 and 18, all of which are adjustable for reasons which will be apparent below.

Post 14 serves as the central support for the tool and carries a horizontal plate 20 at its lower end which is designed to sit on the upper surface of web W of the beam and carry the entire layout tool. Post 14 is composed of the lower sections 22 and 24 respectfully, and the two sections are connected together by threaded stud 26 so that the height of the post may be varied in accordance with the size of the particular beam on which the layout work is to be performed.

A brace 28 parallels the post 14 and is connected at its lower end 30 to plate 20 and at its upper end 32 to bridge 12. Brace 28 is telescopically adjustable in length so as to correspond to the length of post 14. In order to be able to vary the length of the post 14 without rotating the plate 20, the threaded stud 26 joining the upper and lower sections 22 and 24 may, for example, have threads of opposite hand at its top and bottom so as to cause the upper and lower sections to move toward or away from one another as the stud is turned. That stud may have a flat or other facility to receive an appropriate hand tool to enable the user of the layout tool to turn the stud in place. It is to be understood that other arrangements may be used to enable the post 14 to be either enlarged or contracted, and the invention is not limited to the specific form shown.

Bridge 12 which has a sleeve 40 at its mid-portion welded or otherwise secured to the upper section 22 of post 14 in turn carries a pipe section 42 having a collar 44 at its end 46 through which the upper threaded portion 48 of arm 16 extends. The arm 16 is anchored in place on the collar 44 by means of the two adjusting nuts 50 on the top and bottom of the collar. It is evident that by turning the nuts 50 on the threaded portion 48 of the arm, the arm may be raised or lowered on the collar 44.

Sleeve 40 also carries a pipe 52 which extends in a direction opposite to that of pipe 42, and pipe 52 in turn telescopically receives a smaller diameter pipe 54 which carries a collar 56 which may be identical to collar 44. Collar 56 is provided with an opening through which the upper portion 58 of the arm 18 extends, and the arm is supported in place by adjusting nuts 60. The telescoping connection between the larger and smaller pipe sections 52 and 54 enable the collar 56 to be moved toward and away from post 14 so as to vary the distance between the arms 16 and 18. A set screw 62 allows the pipe sections 52 and 54 to be locked in any desired position.

Arms 16 and 18 carry vertical plate 70 and 72 respectively and they essentially may be identical. Each is shown secured to its respective arm by screws 74 and ordinarily, the position of the arms 16 and 18 on bridge 12 is adjusted so that both are of the same length so as to position their respective plates in the same vertical relationship with respect to plate 20.

Figure 3:
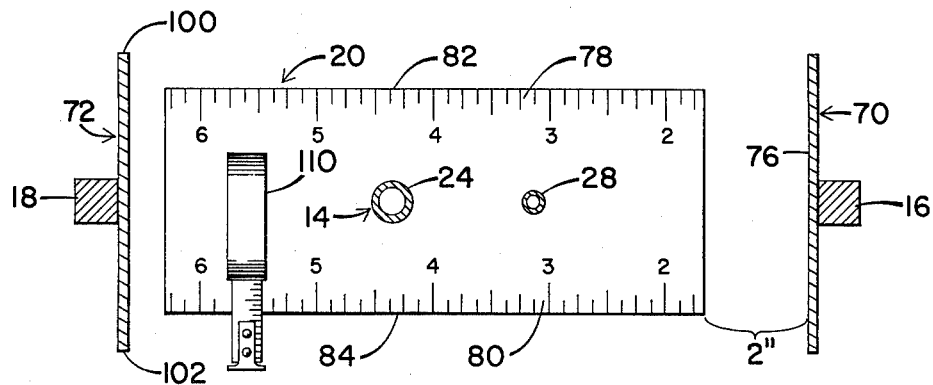
FIG. 3 is a cross sectional view of the tool taken on section line 3—3 of FIG. 2.

Pipe 42 is of a fixed length so as to position the plate 20 a fixed horizontal distance from the inner surface 76 of plate 70. As is clearly shown in FIGS. 1 and 3, plate 20 is provided with scales 78 and 80 on its upper surface along its long edges 82 and 84 respectively, and the scales carry measurements which are referenced to the inner surface 76 of vertical plate 70. Thus, it will be seen in FIG. 3 that the first whole number in the scales 78 and 80 is "2" indicating that the corresponding reference line is 2 inches from the inner surface 76 of plate 70. Thus, both scales 78 and 80 measure distances from the inner surface 76. It will also be appreciated that when the layout tool is placed on the beam as shown in FIG. 1, those scales 78 and 80 indicate measurements from the outer surface of the flange F' of the beam B.

Figure 4:
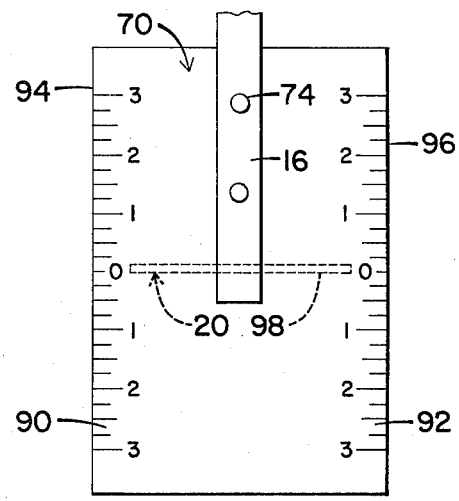
FIG. 4 is a fragmentary side view of the tool viewed in the direction of sight lines 4—4 of FIG. 2.

Vertical plate 70 shown in FIG. 4 also has scales 90 and 92 along its vertical edges 94 and 96 respectively. The scales 90 and 92 each have a zero or reference point at the center which is to be aligned with the center of the web W when the tool is used. And the scales measure distances in inches up and down from the center of the web. It will be noted in FIG. 1 that plate 72 precisely corresponds to the plate 70 and carries scales 100 and 102 along its vertical edges. It should also be appreciated that all of the scales in the present device may either be applied directly to the respective plates by being engraved in them, or alternatively they may be applied for example by means of an engraved band welded, riveted, or otherwise secured to the appropriate plate surfaces.

From the foregoing description it will be appreciated that the tool may be placed on any beam and by adjusting the length of the pipe section 52, 54 and the height of post 14 and arms 16 and 18, the tool may be suitable to layout a beam of any size. It should also be appreciated that in laying out beams, conventionally the coordinates used to define hole locations in the web are referenced to one end of the beam and the outer surface of one flange. The same flange serves as the reference surface for all web holes. Also, conventionally, the coordinates used to define holes in the flanges are referenced to the same one end of the beam and the central plane of the web. Therefore, in mounting the layout tool on the beam, the span of the bridge 12 should be adjusted so that the vertical plates 70 and 72 lie immediately adjacent the outer surfaces of the flanges F' and F" of the beam B, and the heights of post 14 and arms 16 and 18 are adjusted so that the reference or zero point in the scales along the vertical edges of the plates 70 and 72 are coplanar with the center line of the beam web W. This is readily done by the adjustable stud 26 on post 14 and the adjusting nuts 50 and 60 on arms 16 and 18.

With the tool properly adjusted so as to accommodate the particular beam on which it is being used, it is evident that the operator may readily locate any point on the web or flanges. For convenience a tape may be carried on one or more plates 20, 70 and 72 and be oriented to measure the distance of one edge of its plate or any other point on the tool from one end of the beam. Such a tape is suggested at 110 in plate 20. And it is unnecessary to use large layout drawings of the beams to indicate to the worker the location of the holes. Rather, simple tables can be prepared noting for each hole its coordinate distances from one end of the beam and the reference point on the web or flanges, as the case may be, and the skill of a draftsman is not required. In fact, because the beam once positioned remains in the same position and is not rotated for the location of the holes in the flanges and web, mistakes are avoided. The tool of course may be brought to the construction site and all of the fabricating work can be done at the site as opposed to the mill.

Having described this invention in detail those skilled in the art will appreciate that numerous modifications may be made thereof without departing from its spirit. Therefore, I do not intend to limit the breadth of the invention to the specific embodiment illustrated and described. Rather, it is my intention that the scope of this invention be determined by the appended claims and their equivalents.

What is claimed is:

1. A layout tool for structural steel beams having flanges and a web comprising:

a frame having a central vertical post and a horizontal bridge connected intermediate its ends to the top of the post, a horizontal plate connected to the bottom of the post, said plate being arranged to rest on the upper surface of the web of the beam when the beam is positioned with its web in a horizontal plane so as to support the tool on the beam, a pair of legs connected to the ends of the bridge and for extending downwardly therefrom on the outside of the flanges of the beam, vertical plates connected to the legs for lying against the outer surfaces of the flanges, and scales provided on each of the plates for measuring distances on the web from one of the flanges and on the flanges from the central plane of the web.

2. A layout tool for structural steel beams as defined in claim 1 further characterized by means for varying the heights of the post and legs so that the scales on the vertical plates can be referenced to the central plane of the web.

3. A layout tool for structural steel beams as defined in claim 1 further characterized by means for varying the length of the bridge to enable the bridge to span the flanges of the beam and support the vertical plates on the outer surfaces thereof.

4. A layout tool for structural steel beams having flanges and a web comprising:

a frame, a horizontal plate connected to the frame and arranged to rest on the upper surface of the web of the beam when the beam is oriented with its web horizontal, a vertical plate connected to the frame and intended to lie against the outer surface of one flange of the beam, a scale on the horizontal plate referenced to the inner surface of the vertical plate for indicating distance from the flange on the web, a scale on the vertical plate for indicating distances on the flange from the web, a second vertical plate connected to the frame and adapted to lie against the outer surface of the second flange of the beam, a scale on the second vertical plate also indicating distances on its flange from the plane of the web, and means for adjusting the size of the frame to enable it to span the flange with the horizontal plate on the web.

5. A layout tool for structural steel beams as defined in claim 4 further characterized by a scale carried on the tool for measuring distances from one end of the beam.

* * * * *